UNITED STATES PATENT OFFICE.

GERHARD NICOLAAS VIS, OF SCHWEIZERHALLE, SWITZERLAND.

PROCESS OF OBTAINING MAGNESIUM SULFATE FROM BRINE.

SPECIFICATION forming part of Letters Patent No. 658,327, dated September 18, 1900.

Application filed January 29, 1900. Serial No. 3,180. (No specimens.)

*To all whom it may concern:*

Be it known that I, GERHARD NICOLAAS VIS, doctor of philosophy and chemist, a subject of the Queen of the Netherlands, residing at Schweizerhalle, near Basle, Switzerland, have invented a new and useful Process of Obtaining Magnesium Sulfate from Brine, of which the following is a specification.

This invention relates to the production of sulfate of magnesium, (Epsom salt or bitter salt;) and it consists in a process which enables brine to be utilized with advantage as the starting material for said production.

It is well known that most brines contain, besides impurities in the form of salts of calcium, iron and potassium, also a percentage of a magnesium salt or salts. The actual combination in which the magnesium is present in the brine is frequently not to be ascertained; but I shall not be far wrong in assuming that in most cases the magnesium is present in the brine in the form of sulfate of magnesium—that is, "Epsom salts" or "bitter salts." The separation of the magnesium sulfate from the brine is, however, extremely difficult, and it may fairly be said that it is practically impossible to obtain it by concentrating the brine or by first separating the common salt and subsequently causing the Epsom salt to crystallize. In any case a product containing common salt would result, which would have to be purified by recrystallization. The impossibility is proved by the fact that in general salt works allow the mother liquors to be wasted, even when they contain large quantities of magnesium sulfate. The removal of this drawback is desirable for two reasons: first, it would be an advantage to remove the magnesium salt before evaporation in order to obtain a purer brine, and, secondly, the obtaining of commercially-valuable bitter salt would in itself be profitable, and this profit in the case of many brines would be very considerable.

I have invented a process by means of which bitter salt can be obtained from brine without difficulty as a pure product. This process is based, on the one hand, on the precipitation of magnesium hydrate by means of caustic lime and, on the other hand, on the separation of a part of the gypsum by means of sulfate of sodium, and is so carried out that these two reactions are caused to take place in the same vessel. If to a brine containing magnesium sulfate caustic lime is added in the proportion $MgSO_4 : Ca(OH)_2$—that is, one hundred and twenty parts to seventy-four parts—magnesium hydroxide is precipitated, while sulfate of calcium is formed according to the reaction.

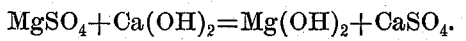
$$MgSO_4 + Ca(OH)_2 = Mg(OH)_2 + CaSO_4.$$

Part of the sulfate of calcium formed enters in solution, the remainder being separated out. Now it is important to separate out so much sulfate of calcium, together with the magnesium hydroxide, that they both are present in the precipitate in the proportion of their molecular weights—that is, about two hundred and thirty-five parts sulfate of calcium to one hundred parts hydrate of magnesium. This is attained by adding, besides the caustic lime, a suitable quantity of Glauber salts, (sulfate of sodium,) such addition having the effect, as described in a prior application filed May 3, 1899, Serial No. 715,480, to cause sulfate of calcium to separate out in proportion to the quantity of Glauber salts added. After the proper quantities of caustic lime and Glauber salts have been ascertained by analysis and experiment they are added to the brine and the mixture is kept agitated for several hours by means of a stirring device. The brine is then filtered and the precipitate, consisting in a mixture of magnesium hydroxide and gypsum, washed with fresh water. The washed mixture is then exposed to the action of carbonic acid, which can be taken either from the air or from furnace-gases. The mixture is preferably exposed in the moist state to the carbonic acid. The reaction taking place is as follows: first, the magnesium hydroxide combines with carbonic acid to magnesic carbonate and then a double decomposition takes place between this magnesic carbonate and the gypsum, whereby calcic carbonate and magnesic sulfate are formed. This reaction can be effected with or without the aid of heat. It is preferably carried out so that the mixture of hydrate of magnesia and gypsum is suspended in water, into which is passed a current of carbonic acid. The solution of bitter salt produced is periodically drawn off and replaced by fresh water until the reaction is complete. It may be mentioned that the carbonic acid must be used with caution, as an excess would cause the formation of soluble bicarbonate of calcium. The solution of bitter salt is drawn off in the state of a clear and pure solution which is ready for crystallization without previous concentration if the process has been carried out with the aid of heat. If produced in the cold, the solution obtained must first be concentrated by evaporation.

The Glauber salts, (sulfate of sodium,) instead of which other sulfates, such as sulfate of aluminium and the like, can be used, is continually recovered as it accumulates in the mother liquor from the production of the sodium chloride.

It is obvious that brine which contains not sulfate but chloride of magnesium can also be treated for the production of Epsom salts according to this process, as caustic lime also reacts with chloride of magnesium with the formation of magnesium hydroxide and calcium chloride.

What I claim, and desire to secure by Letters Patent of the United States, is—

1. The process for obtaining sulfate of magnesium from brine containing magnesium salts which consists in stirring the brine with caustic lime and a soluble sulfate, treating the precipitate obtained with a current of carbonic acid, and removing the magnesium sulfate formed, substantially as and for the purpose specified.

2. The process for obtaining sulfate of magnesium from brine containing magnesium salts, which consists in stirring the brine with caustic lime and a soluble sulfate in such quantities that a precipitate is obtained composed of magnesium hydroxide and calcium sulfate in about the proportion of their molecular weights, treating the precipitate obtained with carbonic acid and removing the magnesium sulfate formed, substantially as and for the purpose specified.

3. The process for obtaining sulfate of magnesium from brine containing magnesium salts, which consists in mixing the brine with caustic lime and Glauber salts, stirring for some time, separating the precipitate from the liquor, exposing it to the action of carbonic acid and removing the sulfate of magnesium formed, substantially as and for the purpose specified.

4. The process for obtaining sulfate of magnesium from brine containing magnesium salts which consists in mixing the brine with caustic lime and Glauber salts, stirring for some time, separating the precipitate from the liquor, suspending the precipitate in water, passing a current of carbonic acid into the suspended precipitate, removing the solution of magnesium sulfate, and causing the same to crystallize, substantially as and for the purpose specified.

5. The process for obtaining sulfate of magnesium from brine containing magnesium salts which consists in mixing the brine with caustic lime and Glauber salts, stirring for some time, separating the precipitate from the liquor, suspending the precipitate in water, heating and passing a current of carbonic acid into the suspended precipitate, removing the solution of magnesium sulfate formed, and causing the same to crystallize, substantially as and for the purpose specified.

In testimony whereof I have hereunto set my hand in presence of two subscribing witnesses.

GERHARD NICOLAAS VIS.

Witnesses:
 GEO. GIFFORD,
 JOHN G. PLATNER.